United States Patent [19]

Masler, III et al.

[11] 4,207,405
[45] Jun. 10, 1980

[54] WATER-SOLUBLE PHOSPHORUS CONTAINING CARBOXYLIC POLYMERS

[75] Inventors: William F. Masler, III, Brecksville; David C. Spaulding, Cuyahoga Falls, both of Ohio

[73] Assignee: The B. F. Goodrich Company, Akron, Ohio

[21] Appl. No.: 902,326

[22] Filed: May 3, 1978

Related U.S. Application Data

[63] Continuation-in-part of Ser. No. 835,660, Sep. 22, 1977, abandoned.

[51] Int. Cl.$^2$ .............................................. C08F 8/40
[52] U.S. Cl. ............................ 525/328; 260/29.6 R; 260/29.6 RW; 260/30.4 R; 260/30.8 R; 210/58; 525/329; 525/340
[58] Field of Search .......................... 526/15, 27, 16; 260/29.6 R, 29.6 RW, 30.4 R, 30.8 R; 210/58; 525/328, 329, 340

[56] References Cited

U.S. PATENT DOCUMENTS

| | | | |
|---|---|---|---|
| 3,262,918 | 7/1966 | Herweh et al. | 526/15 |
| 3,527,726 | 9/1970 | Gower et al. | 526/15 |
| 3,684,779 | 8/1972 | Rapko | 526/15 |
| 3,890,228 | 6/1975 | Hwa et al. | 210/58 |
| 4,046,707 | 9/1977 | Smith et al. | 210/58 |
| 4,048,065 | 9/1977 | Suen et al. | 210/58 |
| 4,088,678 | 5/1978 | Matt et al. | 210/58 |

*Primary Examiner*—John Kight, III
*Attorney, Agent, or Firm*—Alfred D. Lobo

[57] ABSTRACT

The compositions are formed as the reaction product, preferably in an organic solvent, of phosphorous acid or $PCl_3$ and a water-soluble carboxyl polymer. A precursor of phosphorous acid, which precursor is capable of generating phosphorous acid in aqueous solution, may be used, and preferably, the water-soluble carboxyl polymer has a relatively low molecular weight, preferably in the range from about 400 to about 6000. The molar ratio of the reactants, namely of carboxyl polymer, calculated as carboxyl groups to phosphorous acid is in the range from about 10:1 to about 1:1. The carboxyl polymer, such as polyacrylic acid, may be derived from an $\alpha,\beta$-olefinically unsaturated monomer having a carboxyl group, or the carboxyl polymer such as an acid anhydride polymer may be derived from a monomer readily converted to one having a carboxylic acid group.

18 Claims, No Drawings

WATER-SOLUBLE PHOSPHORUS CONTAINING CARBOXYLIC POLYMERS

CROSS REFERENCE TO RELATED APPLICATION

This is a continuation-in-part of our copending U.S. patent application Ser. No. 835,660 filed Sept. 22, 1977 now abandoned.

BACKGROUND OF THE INVENTION

Polyphosphates are used to inhibit and prevent scale and deposit formation in aqueous systems, mainly because they are effective in substoichiometric or threshold quantities, and they are relatively inexpensive. Their proclivity to hydrolyze somewhat unpredictably has initiated their substitution by phosphonic acids and other polyelectrolytes which are stable in aqueous solutions. It is also known that substoichiometric quantities of polyacrylic acid and polymethacrylic acid (hereinafter together referred to as "poly(meth)acrylic acid") inhibit scale formation in aqueous systems. At the present time it is also known that mixtures of carboxylic polymers having a molecular weight of from 1000 to 15,000,000 and aminopoly(methylenephosphonic acid) (British Pat. No. 1,208,827); and, mixtures of lower carboxylic acids such as maleic acid and other organophosphonic acids (British Pat. No. 1,258,067) are useful to inhibit the deposition of scale. These compositions require relatively small quantities of the water-soluble polycarboxylic acid or a derivative thereof. Similarly, U.S. Pat. No. 3,784,469 teaches that cyclohexane-1,2,3,4,5-pentacarboxylic acid is a scale and deposit suppression agent, particularly in the presence of certain organophosphonic acids. Improved compositions for these uses are desired.

SUMMARY OF THE INVENTION

The improved compositions comprise a reaction product in a polar organic solvent medium, of (a) a relatively low molecular weight water-soluble carboxyl polymer and (b) phosphorous acid or a precursor thereof, such as phosphorous trichloride, which precursor is capable of generating phosphorous acid in situ in the organic solvent, i.e., tetrahydrofuran ("THF") or sulfolane. The molar ratio of titratable carboxyl groups in the carboxyl polymer to phosphorous acid is in the range from about 10:1 to about 1:1. By carboxyl polymer we refer to a homopolymer or copolymer of an $\alpha,\beta$-olefinically unsaturated monomer having a carboxyl group, or a precursor thereof, such as a monomer readily converted to one having a carboxyl group, including homopolymers and interpolymers of acrylic acid, methacrylic acid, acrylic acid esters, methacrylic acid esters, maleic anhydride, ethylene-maleic anhydride, and the like. These materials contain bound carboxyl groups in amount of about 0.5 to 2 equivalents per hundred grams of polymer. By relatively low molecular weight we refer to a molecular weight in the range from about 400 to less than about 10,000, and preferably less than about 6000 to 1000. The process for preparing the novel compositions is by reacting a carboxyl polymer with phosphorous acid or phosphorous trichloride, or both, under anhydrous conditions in an organic solvent medium in which the carboxyl polymer is essentially completely soluble. Preferably the reaction product so obtained is treated with water and heated at about 100° C. to remove volatiles and also to hydrolyze residual chlorides and condensed forms, if any, to obtain a hydrolyzed reaction product. By "reaction product" we refer to the post-reaction mass free of organic solvent and containing the reaction product of carboxyl polymer and phosphorous acid, or precursors thereof.

DETAILED DESCRIPTION OF PREFERRED EMBODIMENTS OF THE INVENTION

The materials of this invention find utility in water treatment, detergent formulations, agricultural applications and complexation of trace elements, agricultural micronutrients, soil stabilizers, selective flocculants, stabilization of peroxides against metal ion catalyzed decomposition, electroplating baths, soaps and cosmetics, and the like.

The low molecular weight organic water-soluble carboxyl polymer is reacted with phosphorous acid or a precursor capable of generating phosphorous acid in aqueous solution, provided the proportions of the reactants lie within a range of molar ratios of titratable carboxyl groups to phosphorous acid from about 10:1 to about 1:1. If phosphorous trichloride, or other precursor phosphorous compound is used, its concentration is calculated as phosphorous acid. When used in a water system, the proportion by weight of the reaction product may be as high as about 1 g on a solids basis, per liter of water and even higher concentrations may be used, though it will presently be apparent that there is no economic justification for doing so. By "solids basis" we refer to the reaction product essentially free of organic solvent, or the hydrolyzed reaction product essentially free of water, recognizing that the solids may be in a semi-solid or gum-like state.

More preferably the composition of this invention is formed by the reaction of from about 1 mole to about 10 moles of titratable carboxyl groups in the water-soluble carboxyl polymers, per mole of phosphorous acid or precursor thereof present in a polar organic solvent. Typically the polymer has a molecular weight in the range from about 400 to about 6000, and has repeating units conforming to the structure (I)

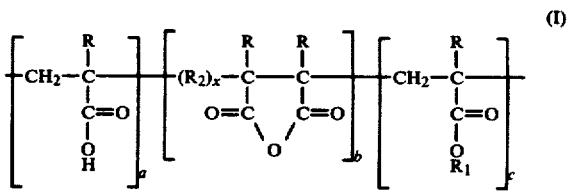

wherein

R represents H, $CH_3$ or $CH_2$—COOH, $R_1$ represents alkyl having from 1 to 18 carbon atoms, $R_2$ represents alkylene having from 2 to 4 carbon atoms, and vinyl having the structure

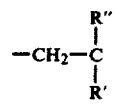

wherein R' represents O—R''' and NH—C(O)R''', R'' may be H or $R_1$, and R''' may be H or $R_1$, x may be in the range from 0 to about 5, a and b each represent from 0 to 100 weight percent based on the combined weight of a+b+c, the sum of the numerical values of a+b+c is always 100, and the monomeric groups are present in a heterogenous relative order, that is, the order in which the monomeric groups appear is immaterial.

The carboxyl polymers used in this invention are the polymers of acrylic acid or methacrylic acid, including derivatives thereof which can be easily converted to the respective carboxylic acid, and may be homopolymers or copolymers thereof. These carboxyl polymers may include minor amounts, less than 50 mole percent, preferably less than 30 mole percent, of the carboxylic acid, of other copolymerizing monomers, vinylidene monomers containing at least one $CH_2<$ group such as ethylene, propylene, isobutylene, styrene, α-methylstyrene, vinyl acetate, vinyl formate, vinyl ethers, acrylonitrile, methacrylonitrile, vinyl chloride, vinylidene chloride, the alkyl acrylates, the alkyl methacrylates, and the unsaturated mono- or di-alkyl maleates and the alkyl fumarates.

Preferred water-soluble carboxyl polymers for the composition of this invention are low molecular weight polymers, preferably having a molecular weight less than 6000 to 800 such as poly(meth)acrylic acid, or those with a major proportion, i.e. usually greater than 50 weight percent of polyacrylic acid or polymethacrylic acid, or a copolymer of acrylic acid and methacrylic acid, such as are commercially available; or, polymaleic acid or polymaleic anhydride prepared as described (Norman G. Gaylor, *J. Macromol. Sci. Revs. Macromol Chem.*, C13(2), 235–261 (1975); or, copolymer of maleic anhydride with an olefin having from 2 to 4 carbon atoms; or a copolymer of maleic anhydride with a vinyl ether or vinyl ester or alkyl (meth)acrylate. Preferred water-soluble carboxyl polymers have repeating units conforming to the structure (I) wherein R represents H, $CH_3$ or $CH_2$—COOH, $R_1$ represents alkyl having from 1 to 18 carbon atoms, $R_2$ represents alkylene having from 2 to 4 carbon atoms, x is from about 0 to 1, a is in the range from about 70 to 98 weight percent based on the combined weight of a+b+c, and b and c are each in the range from about 0 to about 30 percent.

Most preferred are water-soluble carboxyl polymers having repeating units conforming to the structure (II)

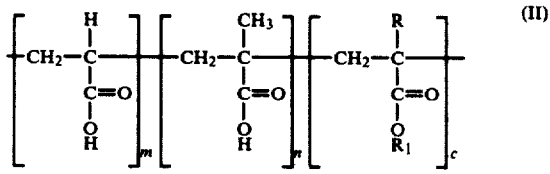

wherein

R represents H, $CH_3$ and $CH_2$—COOH, $R_1$ represents alkyl having from 1 to 18 carbon atoms, c is in the range from 0 to 30 weight percent, m is in the range from about 0 to 100 weight percent, and correspondingly, n is in the range from about 100 to 0 weight percent, and the sum of m+n+c is always 100.

The polymers may be prepared from a batch charge of the monomers in an excess of a lower aliphatic monohydric alcohol or water at a temperature of from about 20° C. to about 200° C. in the presence of from about 0.25 to about 20 parts by weight of a free radical polymerization initiator such as acetyl benzoyl peroxide, peracetic acid, hydroxyheptyl peroxide, isopropyl percarbonate, methyl ethyl ketone peroxide, cyclohexanone peroxide, cyclohexyl hydroperoxide, 2,4-dichloro benzoyl peroxide, cumene hydroperoxide, t-butyl hydroperoxide, acetyl peroxide, lauroyl peroxide, benzoyl peroxide, caprylyl peroxide, methyl cyclohexyl hydroperoxide, t-butyl permaleic acid, t-butyl perbenzoate, di-t-butyl diperphthalate, azobisisobutyronitrile, the so-called redox and heavy metal polymerization initiators and the like, and others. The polymerization reaction embodied in the preparation of the carboxyl polymer may also be initiated by the use of nuclear radiation, x-rays, ultraviolet rays and ultrasonic sound waves. The carboxyl polymers are made in high conversion usually in excess of 80 percent conversion and often as high as from about 95% to about 100%. The polymerizations can be carried out at reflux, in a closed container under autogenous pressure, or under atmospheric pressure, or under artificially induced superatmospheric or subatmospheric pressures, preferably in an oxygen-free atmosphere.

Commonly used carboxylic acid monomers such as acrylic acid, methacrylic acid and itaconic acid, may be copolymerized with acid anhydrides such as maleic anhydride, and/or with alkyl acrylate monomers in bulk in the presence of a suitable free radical polymerization initiator, such as benzoyl peroxide among others listed hereinabove, at moderate temperatures, preferably in the range from about 45°–50° C., or in a dioxane solution, followed by selective partial hydrolysis of the anhydride group, if desired, as is more fully described by Shantarovich et al., *Izv. Akad, Nauk SSR, Khim.*, 10, 224 (1970) (Russ); and ibid., (2) 258-62 (Russ): and by El Saied et al., *Dokl. Adad. Nauk SSR*, 177 (2), 380-2 (1967) (Russ).

The most preferred carboxyl polymers of this invention have titratable carboxyl groups present as acrylic acid in the range from about 60 to about 99 weight percent of the polymer. A useful carboxyl copolymer of this invention may contain an alkyl acrylate ester in any amount which permits the carboxyl polymer to be substantially completely soluble in the solvent used in the reaction. It is generally preferred to use less than 30 percent of the ester.

Preferred polar organic solvents are those in which both reactants, namely carboxyl polymer and phosphorous acid or precursor, are essentially completely soluble so as to provide a homogeneous reaction mass. The reaction is preferably carried out at a temperature in the range from about 0° C. to about 200° C. It will be appreciated that a lower temperature may be used, provided it is above the freezing point of the reaction mass; a higher temperature may also be used provided it is not so high as to cause either the reactants or the reaction product to decompose. Typical solvents are acetic acid, sulfolane (tetrahydrothiophene-1,1-dioxide), di-n-propyl sulfone, tetrahydrofuran (THF), 2-methyl THF, 3-methyl THF, tetrahydropyran and the like. Most preferred solvents are sulfolane and tetrahydrofuran (THF).

The pressure at which the reaction occurs is not critical, and it is conveniently carried out at about atmospheric pressure. It will be evident that the reaction may also be carried out at any pressure at which the reaction mass is maintained in a liquid state. Most preferred is about atmospheric pressure, though subatmospheric pressures and pressures up to about 100 atm may be used.

The extent to which the reaction proceeds, that is, the amount of carboxyl polymer and phosphorous acid reacted, depends upon the particular carboxyl polymer used and the conditions of reaction. Whatever the extent of the reaction, the reaction product contains a compound readily identifiable as a polymer having both carboxyl and phosphonic acid groups.

The compositions provide a corrosion-inhibiting and an unexpected scale-inhibiting effect relative to its individual components. Though it is well known that 1-hydroxyethylidene-1,1-diphosphonic acid (HEDPA) in combination with water-soluble polycarboxylic acids produces a desirable sequestering effect, it should be recognized that HEDPA, by itself, is a good sequestering agent, as are the water-soluble polycarboxylic acids. In contrast, phosphorous acid and compounds capable of generating phosphorous acid in aqueous solution, such as phosphorous trichloride, are by themselves, poor sequestering agents. It is therefore unexpected that phosphorous acid and phosphorous trichloride when reacted with a low molecular weight carboxyl polymer should produce a product having desirable sequestering power.

By a carboxyl polymer which is essentially or substantially completely soluble in water we refer to a polymer which is soluble in water to an extent of at least 1 percent at room temperature. Some carboxyl polymers, for example, low molecular weight (MW 1700) polyacrylic acid may be soluble in an amount up to about 60 percent by weight. Some acid anhydride carboxyl polymers, for example polymaleic anhydride (MW 700) may be soluble in water only after they are hydrolyzed, however polymaleic anhydride is essentially completely soluble in the polar solvents used in this process. The terms "essentially or substantially completely soluble in solvent" are similarly defined.

Though the precise structure of reacted carboxyl polymer in the reaction product is difficult to identify, the indication is that two phosphorus atoms are bound to a reacted carboxyl moiety by phosphorus-to-carbon bonds. The phosphorus atom may be present as phosphonic acid, phosphonic acid ester, or in other molecularly dehydrated forms. A hydrolyzed reaction product may have hydroxy diphosphonic acid groups on various reacted carboxyl groups; it is estimated on the average that from about 1 percent to essentially all the phosphorus charged may be present in the reacted carboxyl groups in one form of the other. In general it is preferred to carry out the reaction so that the ratio of titratable carboxyl groups to phosphorus calculated as phosphorous acid to be reacted, is in the range from about 1.0 to 10.

Preparation of the reaction product may leave a residue of phosphorus compound(s) not bound to the polymer. It is desirable for better product performance in water treatment that the residual phosphorus compounds be reacted with a lower carboxylic acid, acid chloride or acid anhydride or mixtures thereof wherein the carboxylic acid has from about 2 to about 12 carbon atoms. Useful materials include acetic acid, acetic anhydride, acetyl chloride, and the like in amounts to react with the residual phosphorus compounds. $^{31}P$ NMR data indicates a reaction product which contains pendant carboxyl as well as some hyroxymethine diphosphonic acid groups probably in this structure:

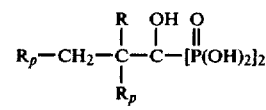

wherein

R represents H or $CH_3$;

$R_p$ represents the remaining polymer.

It is preferred that the reaction be carried out under anhydrous conditions, and either $H_3PO_3$, or $PCl_3$, or both are normally used. Under certain circumstances it may be desirable to use $PCl_3$ as a precursor of $H_3PO_3$, and enough water is added to react with the $PCl_3$ forming $H_3PO_3$ so that there is no free water present. Thus, though some water may be added to a reaction in which $PCl_3$ is a reactant, the reaction with a relatively low molecular weight carboxyl polymer occurs under essentially anhydrous conditions. $PBr_3$ also may be used.

The reaction-products normally will contain from about 1 to 20 weight percent phosphorus. The reaction-products may contain from about 1 percent bound phosphorus up to about 20 weight percent. A useful range is from about 2–15 weight percent.

A hydrolyzed reaction product is formed by hydrolysis of the reaction product described hereinabove. Hydrolysis is conveniently effected with water or steam, and is usually carried to completion. Though a partially hydrolyzed product is useful the substantially completed hydrolyzed reaction product is more preferred.

The molecular weight of the carboxyl polymer chosen is determined by first converting the anhydride and/or free carboxylic acid groups to the methyl ester derivative by the metod of H. L. Cohen, *J. Polymer Science, Polymer Chemistry Ed.*, 14 7 (1976). Molecular weights were then determined by gel permeation chromatography and are relative to polystyrene standards (polystyrene standards are available from Pressure Chemical Co., Smallman St., Pittsburgh, Pa.)

Hereinafter the term "sequestering" is used to connote use of a composition in stoichiometric amounts, and "threshold" is used to connote use of substoichiometric amounts. The compositions of this invention are effective in threshold quantities, that is in an amount which is insufficient to cause complete complexing with the compounds causing scale in water. The threshold effectiveness or "threshold power" is measured in two ways, namely, with respect to precipitation of (A) $CaCO_3$ and (B) $CaSO_4$.

In the following examples the sequestering power (hereinafter referred to for brevity as "power") is measured as mg $CaCO_3$ sequestered per gm of sample, according to the test described in Monsanto Bulletin IC/SCS-313, p. 9 and by Callis C. F., Kerst A. F., and Lyons J. W. in *Coordination Chemistry*, p. 223 (1969). In a typical procedure, 1 g of sample (100% basis) is dissolved in 50 ml distilled water (hereinafter all references to water refer to distilled water, unless otherwise noted) at room temperature (20° C.), the pH is adjusted to 8 with NaOH or acetic acid as necessary. Ten ml of 2% $Na_2CO_3$ is added and the pH again adjusted to 8. The volume is diluted with water to 100 ml and titrated with 44.1 gm/liter calcium acetate monohydrate solution to a distinct and permanent turbidity. Calcium in the titrant is equivalent to 25 mg $CaCO_3$ per ml.

Power = mg $CaCO_3$ sequestered per g of sample

-continued $$= \frac{25 \times \text{(volume titrant solution required-ml)}}{\text{unit wt of sample}}$$

The foregoing test is hereinafter referred to as "the standard sequestering test" or "the standard test for sequestering power", and is the only test used herein to determine "power" (sequestering power).

(A) Threshold test for inhibition of $CaCO_3$ precipitation:

To evaluate the effectiveness of threshold inhibitors for stabilization of calcium carbonate, supersaturated solutions of calcium carbonate are observed in the presence and absence of the inhibitor. The inhibitors are applied at concentrations much lower than stoichiometric amounts (0.1–50 mg/l). The inhibitor compositions are called threshold inhibitors and presumably work by inhibiting the nuclei growth of scale-forming calcium carbonate through a surface phenomenon rather than a mole to mole relationship.

The test is performed as follows: Three solutions are prepared: the inhibitor solution, 1 g/l distilled water; 0.1 M $Na_2CO_3$, 10.6 g/l distilled water; and 0.1 M $CaCl_2 \cdot 2H_2O$, 14.7 g/l distilled water.

Flasks for the test are cleaned with dilute HCl and rinsed with distilled water (hereinafter distilled water will be referred to simply as $H_2O$ or water). Five ml 0.1 M $Na_2CO_3$ solution, 490 ml $H_2O$, and 5 ml 0.1 M $CaCl_2 \cdot 2H_2O$ are added to a 500 ml, Erlenmeyer flask with manual agitation. This is the uninhibited control solution ($V_O$). Five ml 0.1 M $Na_2CO_3$ solution and water (490 ml minus inhibitor solution volume) are added to a 500 ml Erlenmeyer flask. The inhibitor solution is added with agitation to give the desired concentration (1 ppm). Then 5 ml of 0.1 M $CaCl_2 \cdot 2H_2O$ is added with agitation and the mixture is warmed on a hot plate to 65° C. with occasional agitation. The flask is stoppered loosely and placed in a constant temperature bath at 65° C. for 24 hours. After 24 hours at 65° C., a 50 ml sample of the clear supernatant is pippeted out and a Schwartzenbach titration is immediately carried out.

The % inhibition is calculated by the equation below:

$$\frac{V_E - V_O}{V_T - V_O} \times 100 = \% \text{ inhibition where}$$

$V_O$ is the Schwartzenbach titration volume with no inhibitor preent (control).

$V_t$ is the Schwartzenbach titration volume when no precipitation occurs. The titration volume should be 5.0 ml (40 mg/l Ca++ = 100 mg/l $CaCO_3$).

$V_e$ is the experimental titration volume when inhibitors are present in the test solution. Titration volumes will be between 1.25 and 5.0 ml. Duplicate tests are run and titration values of the test samples should be reproducible within 0.1 ml.

(B) Threshold test for inhibition of $CaSO_4$ precipitation.

To evaluate the effectiveness of threshold inhibitors for stabilization of calcium sulfate, supersaturated solutions of calcium sulfate are observed in the presence of the inhibitor. The inhibitors are applied at concentrations much lower than stoichiometric amounts (0.1–50 mg/l). The inhibitor compositions are called threshold inhibitors and work by inhibiting the nuclei growth of scale-forming calcium sulfate through a surface phenomenon rather than a mole to mole relationship.

The test is performed according to the directions below. Three solutions are prepared: inhibitor solution, 1 g/l water; 1 M $Na_2SO_4$, 142 g/l water; and 1 M $CaCl_2 \cdot 2H_2O$, 147 g/l water.

The flasks for the test are cleaned carefully and rinsed with water. Twenty-five ml 1 M $Na_2SO_4$ solution, 450 ml water, and 25 ml of 1 M $CaCl_2 \cdot 2H_2O$ are added to a 500 ml Erlenmeyer flask with manual agitation. This is the uninhibitied or control solution ($V_O$). Twenty-five ml 1 M $Na_2SO_4$ and water (450 ml minus the inhibitor solution volume) are added to a 500 ml Erlenmeyer flask. Then the inhibitor solution is added to give the desired inhibitor concentration (5 ppm) and the flask is gently agitated. Twenty-five ml 1 M $CaCl_2 \cdot 2H_2O$ is added with agitation and the mixture is warmed on a hotplate with occasional mild agitation until a temperature of 65° C. is reached. The flask is loosely stoppered and placed in a 65° C. constant temperature bath for 24 hours. After 24 hours, a 2 ml sample is pipetted out, diluted to 50 ml with water, and a Schwartzenbach titration is immediately carried out.

The percent inhibition is calculated by the equation below:

$$\frac{V_E - V_O}{V_T - V_O} \times 100 = \% \text{ inhibition where}$$

$V_O$ is the Schwartzenbach titration volume with no inhibitor present (control). The titration volume should be approximately 4.4 ml (880 mg Ca++/l or 3000 mg $CaSO_4$/l).

$V_T$ is the Schwartzenbach titration volume when no precipitation occurs. The titration volume should be 10.0 ml (2000 mg Ca++/l or 6800 mg $CaSO_4$/l). This may be diluting 25 ml of the 1 M $CaCl_2 \cdot 2H_2O$ to 500 m to 50 ml should give a Schwartzenbach titration volume of 10.0 ml.

$V_E$ is the experimental Schwartzenbach titration volume when inhibitors are present in the test solution. The titration volumes should be between 4.4 and 10.0 ml. Duplicate tests are run and titration values of the test samples should be reproducible within 0.1 ml.

The corrosion test data were recorded as follows with a Petrolite Model M-103 portable corrosion rate meter. Mild steel probes were used. The tests were performed at 55° C. using water as specified in the table. Except where corrosion was quite severe (>10 mpy) the results by the electrochemical method compared quite favorably with the standard ASTM weight loss method. In cases of severe corrosion, the weight loss method gives higher corrosion rates. All data listed are from the Petrolite meter.

The apparatus consisted of a 7 l test tank fitted with a constant temperature circulator and an overflow to waste. A bellows pump was used to introduce fresh inhibited water from a 15 gallon feed tank to the test tank at a rate of 10 ml/min (5 gal/day). The feed tank was filled with water and inhibitor formulation at the desired concentration and the pH was adjusted with $H_2SO_4$ or NaOH as required to maintain a pH in the test tank at about 8.0. The test tank was charged with 7 l of water and inhibitor pretreat at 3 times the concentration in the feed tank. The pH in the test tank was adjusted to the same value as in the feed tank. Residence time of the pretreat solution in the test tank is approximately 12 hours. This test is performed according to ASTM D2776-72.

In the following examples, the moles of carboxyl polymer are based on the moles of titratable carboxyl groups; and the number of moles of phosphorous acid, which number is used to compute the ratio of COOH/$H_3PO_3$, is stated as if the phosphorus was present as phosphorous acid. All acrylic acid polymers used in the Examples contained 3% water.

EXAMPLE 1

Polyacrylic acid (MW 1700) and $PCl_3$ in a molar ratio of 2.0 are reacted in sulfolane to prepare a solvent-free reaction product as follows: A 1 liter flask is charged with 53 g (0.6 mol) of polyacrylic acid (MW 1700) 130 g sulfolane and 3.3 g water. Gradually, over a period of about 2 minutes, 26 ml $PCl_3$ (0.3 mol) is stirred into the mixture to form a homogenous reaction mixture. This reaction mixture is heated to 100° C. for about 3 hours and allowed to cool to below 60° C. The cooled mixture is poured, while stirring, into a 1 liter flask containing about 500 ml $CHCl_3$. A precipitate is formed which is filtered and washed with 200 ml $CHCL_3$. Residual $CHCl_3$ is removed at room temperature under vacuum of 29" Hg. A light yellow powder weighing 70 g is isolated. Sulfolane is recovered for reuse from the chloroform solution.

EXAMPLE 2

Polymaleic anhydride (MW 700) and $H_3PO_3$ in a molar ratio of carboxyl groups to $H_3PO_3$ of 2.98 are reacted in sulfolane to prepare a solvent-free reaction product as follows:

A 500 ml flask is charged with 49 g (0.5 mol) of polymaleic anhydride (MW 700), 75 g sulfolane, and 27.5 g $H_3PO_3$ (0.335 mol). This mixture is heated at 140° C. for about 3 hours with stirring, which produces a homogeneous liquid reaction mass. The sulfolane is removed from the reaction mixture by vacuum distillation at 115° C. and about 0.5 mm Hg. The semisolid product is homogenized with a Waring blender is about 200 ml $CH_2Cl_2$. The slurry is filtered and washed with 200 ml $CH_2Cl_2$. The resulting paste is dried in a vacuum oven at room temperature and 29" Hg vacuum to give 42.3 g of a fine light tan powdery product. The sulfolane is recovered for reuse from the $CH_2Cl_2$ solution.

EXAMPLE 3

Polyacrylic acid (MW 1700) and $PCl_3$ in a molar ratio of carboxyl groups to a $PCl_3$ of 1.67 are reacted in sulfolane to prepare a solvent-free reaction product as follows:

A 1 liter flask is charged with 87.3 g (1 mol) of polyacrylic acid (MW 1700), 175 g sulfolane, and 6 g (0.33 mol) water. Gradually, over about 10 minutes, 52 ml (0.6 mol) of $PCl_3$ is added. There is initial foaming and HCl evolution. The homogeneous reaction mixture is heated at 115° for 3 hours during which time it remains homogeneous. The reaction mixture is allowed to cool to less than 60° C. and the product is precipitated with $CHCl_3$. The solid product is filtered and washed with $CHCl_3$ and is then dried at room temperature in a vacuum of 29" Hg. The sulfolane is recovered for reuse from the chloroform solution. The yield of dry light yellow powdery product is 124 g.

EXAMPLE 4

Polyacrylic acid (MW 5000) and $PCl_3$ is a molar ratio of 2.0 are reacted in sulfolane to prepare a solvent-free reaction product as follows:

A 1 liter flask is charged with 49.5 g (0.6 mol) of polyacrylic acid (MW 5000), 150 g sulfolane, and 1.8 g (0.1 mol) water. Gradually, over about 10 minutes 26 ml (0.3 mol) of $PCl_3$ is added. There is initial foaming and HCl evolution. The homogeneous reaction mixture is heated at 90° for 3 hours during which time it remains homogeneous. The reaction mixture is then allowed to cool to less than 60° and the reaction product is precipitated with $CHCl_3$. The solid product is filtered and washed with $CHCl_3$ and is then dried at room temperature in a vacuum of 29" Hg. The sulfolane is recovered from the chloroform solution for reuse. The yield of dry light yellow powdery product is 64 g.

EXAMPLE 5

Polymethacrylic acid (MW 6000) and $PCl_3$ in a molar ratio of carboxyl groups to $PCl_3$ of 2.0 are reacted in sulfolane to prepare a solvent-free reaction product as follows:

A 1 liter flask is charged with 59 g (0.6 mol) of polyacrylic acid (MW 6000), 177 g sulfolane, and 3.5 g (0.19 mol) water. Gradually, over about 10 minutes, 26 ml (0.3 mol of $PCl_3$ is added. There is slight initial foaming and HCl evolution. The reaction mixture is heated at 115° for 3 hours. The reaction mixture is allowed to cool to less than 40° and the product is precipitated with $CH_2Cl_2$. The solid product is filtered and washed with $CH_2Cl_2$ and is then dried at room temperature in a vacuum of 29" Hg. The solfolane is recovered for reuse from the methylene chloride solution. The yield of light yellow-orange solid product is 88.7 g.

Test data for the sequestering power of the solvent-free reaction products, using $CaCO_3$ in the standard test, for this and other examples, are set forth in Table I hereinbelow.

Test data for threshold inhibition of $CaCO_3$ at 1 ppm and $CaSO_4$ at 5 ppm respectively of solvent-free reaction product are set forth in Table II.

Test data for the corrosion inhibition of mild steel by 50 ppm of solvent-free reaction product are set forth in Table III.

EXAMPLE 6

Polymaleic anhydride (MW 700) and $H_3PO_3$ in a molar ratio of carboxyl groups to $H_3PO_3$ of 2.98 are reacted in sulfolane to prepare a hydrolyzed reaction product as follows:

A 500 ml flask is charged with 49 g (0.5 mol) of polymaleic anhydride (MW 700), 75 g sulfolane and 27.5 g (0.335 mol) of $H_3PO_3$. This mixture is heated at 115° for 3 hours with stirring, and a homogeneous reaction mass is produced. The mixture is then allowed to cool to less than 90° and 150° ml water is added. The mixture is heated and allowed to reflux for 1 hour after which time it is cooled to less than 60° and extracted with chloroform (3×75 ml). The aqueous product solution is freed of residual chloroform on a rotary evaporator at 50° and 29" Hg vacuum. An aqueous solution results weighing 220 g and containing 31.8% solids. The sulfolane is recovered for reuse from the chloroform extracts.

EXAMPLE 7

Polyacrylic acid (MW 1700) and PCl$_3$ in a molar ratio of 1.69 are reacted in sulfolane and the reaction product used to prepare a hydrolyzed reaction product as follows:

A 1 liter flask is charged with 86.4 g polyacrylic acid (1.0 mol), 260 g sulfolane, and 10.8 g (0.7 mol) water. Gradually 52 ml PCl$_3$ (0.6 mol) is added over about 10 minutes which produces initial foaming and HCl evolution. A homogeneous reaction mixture is formed. The reaction mixture is heated at 100°-110° C. for about 3 hours during which it remains homogeneous; it is then allowed to stand at room temperature overnight. Then 300 ml water is added, the mixture thoroughly stirred, and extracted with dichloromethane. The mixture is then repeatedly extracted with chloroform and a cloudy yellow aqueous layer is obtained. The mixture is then steam distilled to obtain a brown product. A sample of the product is found to have a sequestering power of 800 mg CaCO$_3$/g of sample, with the standard test. When this product was analyzed by $^{31}$P NMR a resonance at −18.96 ppm relative to external 85% H$_3$PO$_4$ was observed. This resonance corresponds to that expected for a 1-hydroxy-1,1-diphosphonic acid. Analysis of the samples by $^{31}$-P NMR indicated that 62 mole percent of the phosphorus in the product was present as hydroxydiphosphonic acid and 38 mole percent of the phosphorus in the product was present as phosphorous acid. This sample contained 3.62 weight percent total phosphorus.

EXAMPLE 8

Polyacrylic acid (MW 5000) and PCl$_3$ in a molar ratio of 2.0 are reacted in sulfolane to prepare a hydrolyzed reaction product as follows:

A 1 liter flask is charged with 48 g (0.6 mol) of polyacrylic acid (MW 5000), 150 g sulfolane, and 3.3 g water. Gradually, over a period of about 2 minutes, 26 ml PCl$_3$ (0.3 mol) is added into the stirred mixture to form a homogeneous reaction mixture. This reaction mixture is heated to 115° C. for about 3 hours and then is allowed to cool to below 60° C. Water (100 ml) is added and the mixture is steam distilled until 400 ml of distillate have been collected. The mixture is allowed to cool and is then extracted with 3×100 ml CHCl$_3$. Traces of CHCl$_3$ in the aqueous solution are removed on a rotary evaporator at about 50° C. and 29″ Hg vacuum. A light brown aqueous solution (268 g) containing 25.5% solids results. The sulfolane may be recovered from the CHCl$_3$ extracts for reuse. Analysis of the samples by $^{31}$P indicate that 38 mole percent of the phosphorus in the product was present as hydroxydiphosphonic acid and 62 mole percent of the phosphorus in the product was present as phosphorous acid. This sample contained 3.10 weight percent total phosphorus.

EXAMPLE 9

Polyacrylic acid (MW 1700), acetic acid, and PCl$_3$ in a molar ratio of (polymer plus acetic acid carboxyl groups) to PCl$_3$ of 4.0 are reacted to prepare a reaction product as follows:

A 1 liter flask is charged with 85 g (1 mol) polyacrylic acid (MW 1700) and acetic acid 180 g (3 mol). Gradually, over about 2 minutes, 87 ml PCl$_3$ (1 mol) is added to the stirred mixture. The mixture is heated to 100° C. for 2 hours and a finely dispersed suspension of particles results. The heating is increased to 120° for 1 hour, and HCl is smoothly and continuously evolved during the 3 hour heating period. The reaction mixture is treated by steam distillation to recover the reaction product as a pale brown solution weighing 572 g and containing 30.3% solids. Analysis of the samples by $^{31}$P NMR indicated that 94 mole percent of the phosphorus in the product was present as hydroxydiphosphonic acid and 6 mole percent of the phosphor in the product was present as phosphorous acid. This sample contained 5.06 weight percent total phosphor

EXAMPLE 10

Polyacrylic acid (MW 1700) and PCl$_3$ in a molar ratio of 1.25 are reacted in THF and the reaction product used to prepare a hydrolyzed reaction product as follows:

A 1 liter flask is charged with 86.4 g polyacrylic acid (1.0 mol) and 260 g THF. Gradually, over a period of about 2 minutes, 70 ml PCl$_3$ (0.8 mol) is stirred into the flask to form a homogeneous mixture which is heated to reflux and allowed to reflux for about 2 hours. After cooling to about 40° C., 14.4 ml water is added slowly and the mixture stirred for 15 minutes. THF was removed on a rotary evaporator to yield 200 g of product. Then 400 ml water is added and 200 ml solvent is removed by distillation. The product is filtered and weighed to yield 402 g of a light yellow solution containing 143.9 g total solids.

When a sample of this product was analyzed by $^{31}$P NMR a resonance at −18.96 ppm relative to external 85% H$_3$PO$_4$ was observed. This resonance corresponds to that expected for a 1-hydroxy-1,1-diphosphonic acid. A sample of this product produced a sequestering power of 1612 mg CaCO$_3$/g of sample, using the standard test. Analysis of the samples by $^{31}$P NMR indicated that 8 mole percent of the phosphorus in the product was present as hydroxydiphosphonic acid and 92 mole percent of the phosphorus in the product was present as phosphorous acid. It is estimated that this represents 2.8 weight percent of phosphorus bound to the polymer. This sample contained 5.57 weight percent total phosphoruss.

EXAMPLE 11

Polyacrylic acid (MW 1700) and PCl$_3$ in a molar ratio of 1.69 are reacted in THF and the reaction product used to form a hydrolyzed reaction product as follows:

A 3 liter flask is charged with 356.4 g polyacrylic acid (MW 1700) and 1040 g THF. The mixture is stirred until the polymer disolves and then 330 g PCl$_3$ (2.4 mol) is added gradually over about 10 minutes. The mixture is heated and allowed to reflux for about 0.5 hours and then the heat is removed and 50 ml water (2.8 mol) is added over about 45 minutes. The mixture is then heated at reflux for about 2.5 hours. THF is removed by concentrating under vacuum on a rotary evaporator. The reaction product is treated by steam distillation to recover an aqueous solution of hydrolyzed reaction product, weighing 3217 g and containing 22.2% solids. A water insoluble polymer fraction was also recovered.

Analysis of the samples by $^{31}$P NMR indicated that 16 mole percent of the phosphorus in the product was present as hydroxydiphosphonic acid and 84 mole percent of the phosphorus in the product was present as phosphorous acid. It is estimated that this represents 3.2 weight percent of phosphorus bound to the polymer.

This sample contained 4.07 weight percent total phosphorus.

Examples of hydrolyzed reaction products tested for sequestering of $CaCO_3$ are set forth in Table IV. These compositions are also tested for threshold inhibition of $CaCO_3$ and $CaSO_4$, and for corrosion inhibition. The results of these tests being set forth in Table V and VI respectively, hereinbelow.

TABLE I

Test Data for Sequestering Power ($CaCO_3$) Of Solvent-Free Reaction Products

| Product From Ex. No. | Components | Mol Ratio $CO_2H/PCl_3$ | Reaction Solvent | Power |
|---|---|---|---|---|
| 1 | Polyacrylic Acid (MW 1700) + $PCl_3$ | 2 | Sulfolane | 750 |
| 2 | Polymaleic anhydride (MW 700) + $H_3PO_3$ | 2.98 | Sulfolane | 700 |
| 3 | Polyacrylic acid (MW 1700) + $PCl_3$ | 1.69 | Sulfolane | 750 |
| 4 | Polyacrylic acid (MW 5000) + $PCl_3$ | 2.0 | Sulfolane | 625 |
| 5 | Polymethacrylic acid (MW 6000) + $PCl_3$ | 1.69 | Sulfolane | 700 |

TABLE II

Test Data For Threshold Inhibition Of $CaCO_3$ and $CaSO_4$ By Solvent-Free Reaction Products

| Product From Ex. No. | Components | Mol Ratio $CO_2H/H_3PO_3$ | Reaction Solvent | % Inhibition ♀ $CaCO_3$ | % Inhibition + $CaSO_4$ |
|---|---|---|---|---|---|
| 1 | Polyacrylic acid (MW 1700) + $PCl_3$ | 2.0 | Sulfolane | 60 | 70 |
| 2 | Polymaleic Anhydride (MW 700) + $H_3PO_3$ | 2.98 | Sulfolane | 59 | 37 |
| 3 | Polyacrylic acid (MW 1700) + $PCl_3$ | 1.69 | Sulfolane | 56 | 48 |
| 4 | Polyacrylic acid (MW 5000) + $PCl_3$ | 2.0 | Sulfolane | 49 | 32 |
| 5 | Polymethacrylic acid (MW 6000) + $PCl_3$ | 1.69 | Sulfolane | 44 | 17 |

♀ Using 1 ppm solvent-free reaction solvent.
+ Using 5 ppm solvent-free reaction product.

TABLE III

Test Data For Corrosion Inhibition ♀ of Mild Steel By 50 ppm of Solvent-Free Reaction Products

| Product From Ex. No. | Components | Mol Ratio $CO_2H/PCl_3$ | Reaction Solvent | pH | Corrosion + Inhibition, % |
|---|---|---|---|---|---|
| — | Tapwater | — | — | 8.0 | 0 |
| 1 | Polyacrylic acid (MW 1700) + $PCl_3$ | 2.0 | Sulfolane | 8.0 | 90 |
| 2 | Polymaleic Anhydride (MW 700) + $H_3PO_3$ | 2.98 | Sulfolane | 7.9 | 84 |
| 3 | Polyacrylic acid (MW 1700) + $PCl_3$ | 1.69 | Sulfolane | 8.0 | 93 |
| 4 | Polyacrylic acid (MW 5000) + $PCl_3$ | 2.0 | Sulfolane | 8.0 | 52 |
| 5 | Polymethacrylic acid (MW 6000) + $PCl_3$ | 1.69 | Sulfolane | 8.0 | 64 |

+ Normalized for comparison with water alone.
♀ In 55° C. aerated Cleveland Municipal water.

TABLE IV

Test Data For Sequestering Power ($CaCO_3$) Of Hydrolyzed Reaction Products

| Product From Ex. No. | Components | Mol Ratio $CO_2H/H_3PO_3$ | Reaction Solvent | Power |
|---|---|---|---|---|
| 6 | Polymaleic Anhydride (MW 700) + $H_3PO_3$ | 2.98 | Sulfolane | 850 |
| 7 | Polyacrylic acid (MW 1700) + $PCl_3$ | 1.69 | Sulfolane | 800 |
| 8 | Polyacrylic acid (MW 5000) + $PCl_3$ | 2.0 | Sulfolane | 725 |
| 9 | Polyacrylic acid (MW 1700) + $PCl_3$ | 4.0 | Acetic Acid | 375 |
| 10 | Polyacrylic acid (MW 1700) + $PCl_3$ | 1.25 | THF | 1612 |
| 11 | Polyacrylic acid (MW 1700) + $PCl_3$ | 1.69 | THF | 1711 |

TABLE V

Test Data For Threshold Inhibition of Calcium Carbonate Precipitation And Of Calcium Sulfate Precipitation By Hydrolyzed Reaction Products

| Product From Ex. No. | Components | Mol Ratio $CO_2H/H_3PO_3$ | Reaction Solvent | % Inhibition ♀ $CaCO_3$ | + $CaSO_4$ |
|---|---|---|---|---|---|
| 6 | Polymaleic Anhydride (MW 700) + $H_3PO_3$ | 2.98 | Sulfolane | 65 | 51 |
| 7 | Polyacrylic acid (MW 1700) + $PCl_3$ | 1.69 | Sulfolane | 31 | 91 |
| 8 | Polyacrylic acid (MW 5000) + $PCl_3$ | 2.0 | Sulfolane | 45 | 33 |
| 9 | Polyacrylic acid (MW 1700) + $PCl_3$ | 4.0 | Acetic acid | 99 | 84 |
| 10 | Polyacrylic acid (MW 1700) + $PCl_3$ | 1.25 | THF | 60 | 75 |
| 11 | Polyacrylic acid (MW 1700) + $PCl_3$ | 1.69 | THF | 58 | 98 |

♀ Using 1 ppm hydrolyzed reaction product.
+ Using 5 ppm hydrolyzed reaction product.

TABLE VI

Test Data For Corrosion Inhibition ♀ Of Mild Steel By 50 ppm Of Hydrolyzed Reaction Product

| Product From Ex. No. | Components | Mol Ratio $CO_2H/H_3PO_3$ | Reaction Solvent | pH | Corrosion+ Inhibition, % |
|---|---|---|---|---|---|
| — | Water | — | — | 8.0 | 0 |
| 6 | Polymaleic Anhydride (MW 700) + $H_3PO_3$ | 2.98 | Sulfolane | 7.8 | 96 |
| 7 | Polyacrylic acid (MW 1700) + $PCl_3$ | 1.69 | Sulfolane | 8.0 | 95 |
| 8 | Polyacrylic acid (MW 5000) + $PCl_3$ | 2.0 | Sulfolane | 8.0 | 91 |
| 9 | Polyacrylic acid (MW 1700) + $PCl_3$ | 4.0 | Acetic acid | 8.0 | 74 |
| 10 | Polyacrylic acid (MW 1700) + $PCl_3$ | 1.25 | THF | 8.1 | 72 |
| 11 | Polyacrylic acid (MW 1700) + $PCl_3$ | 1.69 | THF | 8.0 | 95 |

♀ Aerated Cleveland Municipal water.
+ Normalized for comparison with water alone.

We claim:

1. A composition comprising the reaction product of a water soluble carboxyl polymer having a molecular weight in the range from about 400 to about 10,000 and phosphorous acid or precursors thereof in a mole ratio of carboxyl groups in the carboxyl polymer to phosphorous acid in the range of from about 10:1 to about 1:1, calculated as the ratio of titratable carboxyl groups to phosphorous acid, said reaction product being formed by heating said carboxyl polymer and phosphorus acid as a homogeneous reaction mass under anhydrous conditions in a suitable organic solvent medium, said reaction product including a polymer having both carboxyl and phosphonic acid groups, two phosphorus atoms being bound to a reacted carboxyl moiety by phosphorus-to-carbon bonds.

2. A composition of claim 1 selected from the group consisting of a reaction product consisting essentially of a water-soluble carboxyl polymer having a molecular weight in the range from about 400 to about 10,000 and phosphorous acid or precursor thereof, in a molar ratio of carboxyl polymer having repeating units conforming to the structure

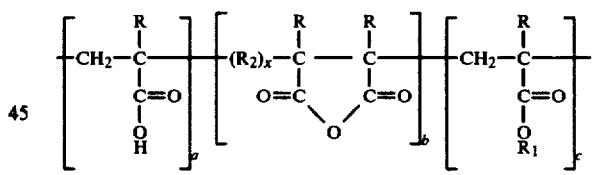

wherein
R represents H, $CH_3$ or $CH_2$—COOH,
$R_1$ represents alkyl having from 1 to 18 carbon atoms;
$R_2$ represents alkylene having from 2 to 4 carbon atoms, and vinyl having the structure

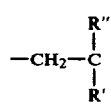

wherein
R' represents O-R''' and NH- C(0)R'''
R'' may be H or $R_1$ and, R''' may be H or $R_1$
x may be in the range from 0 to about 5,
a and b each represent from 0 to 100 weight percent, based on the combined weight of a+b+c, c represents from 0 to about 30 weight percent based on the combined weight of a+b+c, the sum of the numerical values of a+b+c is always 100, and the monomeric groups are present in a heterogenous relative order.

3. The composition of claim 2 wherein said carboxyl polymer has a molecular weight in the range from about 400 to about 6000 and contains from about 60 to 100 percent acrylic or titratable methacrylic acid, R represents H and CH$_3$
b is 0, and repeating unit

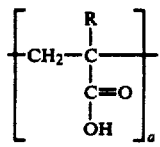

consists essentially of repeating units

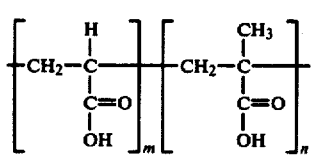

wherein m is in the range from 0 to 100 weight percent, and correspondingly, n is in the range from 100 to 0 weight percent, and the sum of m+n+c is always 100.

4. The composition of claim 1 wherein said carboxyl polymer has repeating units conforming to the structure

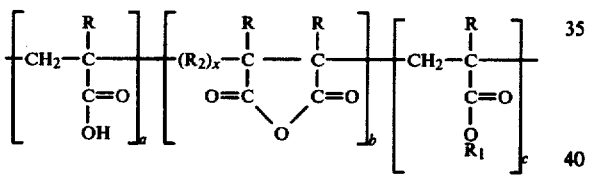

wherein
R represents H, CH$_3$ or CH$_2$—COOH,
R$_1$ represents alkyl having from 1 to 18 carbon atoms,
R$_2$ represents alkylene having from 2 to 4 carbon atoms, and vinyl having the structure

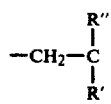

wherein
R' represents O—R''' and NH—C(0)R'''
R'' may be H or R$_1$, and R''' may be H or R$_1$''
x may be in the range from 0 to about 5,
a and b each represent from 0 to 100 weight percent, based on the combined weight of a+b+c, c represents from 0 to about 30 weight percent based on the combined weight of a+b+c, the sum of the numerical values of a+b+c is always 100, and the monomeric groups are present in a heterogenous relative order.

5. The composition of claim 1 wherein said composition is essentially free from solvent.

6. A composition formed by (a) heating, under anhydrous conditions, a carboxyl polymer having a molecular weight in the range from about 400 to about 10,000 and containing about 0.5 to 2.0 equivalents per hundred of polymer of bound COOH groups with phosphorous acid or precursor thereof, as a homogeneous reaction mass in a suitable organic solvent medium, said carboxyl polymer and phosphorous acid being present in a molar ratio in the range from about 10:1 to about 1:1, said molar ratio being calculated as the molar ratio of titratable carboxyl groups to phosphorous acid, (b) treating said mixture with water, (c) distilling said mixture to remove volatiles and (d) recovering a hydrolyzed reaction product of said carboxyl polymer and said phosphorous acid, or precursors thereof.

7. The composition of claim 6 wherein said carboxyl polymer has repeating units conforming to the structure

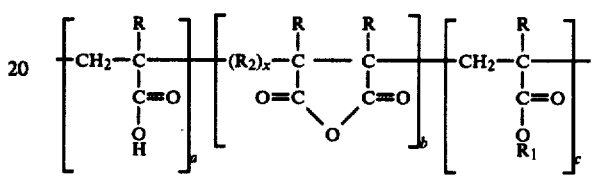

wherein
R represents H, CH$_3$ or CH$_2$—COOH,
R$_1$ represents alkyl having from 1 to 18 carbon atoms,
R$_2$ represents alkylene having from 2 to 4 carbon atoms, and vinyl having the structure

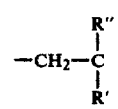

wherein
R' represents O—R'' and NH—C(0)R''',
R'' may be H or R$_1$ and, R''' may be H or R$_1$,
x may be in the range from 0 to bout 5,
a and b each represent from 0 to 100 weight percent, based on the combined weight of a+b+c, c represents from 0 to about 20 weight percent based on the combined weight of a+b+c, the sum of the numerical values of a+b+c is always 100, and the monomeric groups are present in a heterogeneous relative order.

8. The composition of claim 7 wherein R represents H and CH$_3$, b is 0 and repeating unit

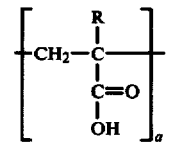

consists essentially of repeating units

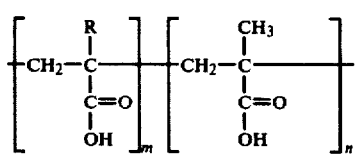

wherein m is in the range from 0 to 100 percent, and correspondingly, n is in the range from 100 to 0 weight percent, and the sum of m+n+c is always 100.

9. A composition of claim 1 wherein the solvent is selected from the group consisting of sulfolane and tetrahydrofuran.

10. A water solution of a composition of claim 1.
11. A water solution of a composition of claim 2.
12. A water solution of a composition of claim 3.
13. A water solution of a composition of claim 4.
14. A water solution of a composition of claim 5.
15. A water solution of a composition of claim 6.
16. A water solution of a composition of claim 7.

17. A composition comprising the reaction product of polyacrylic acid having a molecular weight from about 800 to about 6,000 reacted with phosphorous acid or a precursor thereof in a mole ratio of carboxyl groups in the polyacrylic acid to phosphorous acid in the range of from about 10:1 to about 1:1, calculated as the ratio of titratable carboxyl groups to phosphorous acid, said reaction product being formed by heating the polyacrylic acid and phosphorous acid as a homogeneous reaction mass under anhydrous conditions in a suitable organic solvent medium, said reaction product containing from about 1 to about 20 total weight percent of phosphorus.

18. A composition of claim 7 wherein said polyacrylic acid has a molecular weight from about 1,000 to about 3,000 and contains from about 6 to 16 weight percent total phosphorous, of which at least about 1 weight percent is bound to said polyacrylic acid.

* * * * *